United States Patent [19]

Buser et al.

[11] 4,393,517

[45] Jul. 12, 1983

[54] PULSE CODE MODULATION OF LASER PULSE TAIL

[75] Inventors: Rudolph G. Buser, Wall, N.J.; Gregory R. Osche, Acton, Mass.; Neal T. Nomiyama, Reston; Robert S. Rohde, Springfield, both of Va.

[73] Assignee: The United States of America as represented by the Secretary of the Army, Washington, D.C.

[21] Appl. No.: 192,276

[22] Filed: Sep. 30, 1980

[51] Int. Cl.³ .............................................. H04B 9/00
[52] U.S. Cl. ..................................... 455/608; 455/611; 455/618
[58] Field of Search ............... 455/609, 610, 611, 616, 455/618, 604, 608; 372/12, 26, 27; 332/7.51; 356/4.5

[56] References Cited

U.S. PATENT DOCUMENTS 3,243,592  3/1966  Tomiyasu et al. .................. 455/611
3,420,600  1/1969  Mevers et al. ...................... 455/611

Primary Examiner—Joseph A. Orsino, Jr.
Attorney, Agent, or Firm—Robert P. Gibson; Milton W. Lee; Max L. Harwell

[57] ABSTRACT

The tail of a carbon-dioxide ($CO_2$) transverse electrode discharge at atmospheric pressure (TEA) laser pulse optical signal is pulse code modulated by a Pockels Cell. A modulation depth of 100% is obtained to prevent high false alarm rates under dynamic transmission conditions. The device external to the laser cavity will extend the capabilities of the $CO_2$ TEA laser by using a tail for information transfer while preserving the gain switch spike for rangefinding. A high repetition rate is achieved using a power supply that electrically charges and discharges the Pockels Cell which, in turn, activates the polarization switch.

8 Claims, 3 Drawing Figures

PULSE CODE MODULATION OF LASER PULSE TAIL

The invention described herein may be manufactured, used, and licensed by the U.S. Government for governmental purposes without the payment of any royalties thereon.

BACKGROUND OF THE INVENTION

1. Field of the Invention

The invention pertains to the use of a given laser output format for various applications in which the laser output is used for both rangefinding and information transfer.

2. Description of the Prior Art

Normally, the gain switched spike of the laser pulse is used for ranging and the tail portion is unused, which means that kilowatts of power are thrown away. The present invention is comprised of a means to use the tail of the $CO_2$ TEA laser pulse for information transfer. The old power supplies only triggered the Pockels Cell modulator one pulse at a time per laser pulse. However, the present power supply continually pulses during the time the laser pulse is present.

SUMMARY OF THE INVENTION

The purpose of the invention is to use a given laser output format for more than one application. In the case of a $CO_2$ TEA laser, the output of the laser is used for both rangefinding and for information transfer. An objective of the present invention is to obtain a 100% modulation of the laser pulse tail for generic information transfer systems, and thus prevent high false alarm rates.

The present invention is comprised of either a single-pass or double-pass Pockels Cell modulator which allows the user to supply only half the half-wave voltage required to obtain 90° rotation in phase. Pulse code modulation (PCM) of the tail of the $CO_2$ TEA laser pulse is a novel approach to extend the utilization of this type laser. The present concept makes use of the tail without changing the gain switch spike characteristics. However, the Pockels Cell modulator may also be used to shape the gain switched spike and eliminate the tail portion to improve ranging accuracy.

Limitations prior to this invention have been mainly centered on the power supply which modulates the Pockels Cell. There has been the need for pulse code modulation (PCM) of about 1300 volts to be applied to the Pockels Cell at high repetition rates and with short rise and fall time. The present system solves that problem. PCM of the tail portion of the laser beam gain switched spike is a novel approach to extending the use of the $CO_2$ TEA laser to include transfer of coded data between two points. The coded data may be communication between two tanks or just plain data relayed to a receiver.

In the present system, a portion of the laser beam gain switched spike is reflected off a beam splitter onto a timing detector. The timing detector has an output signal therefrom that is applied to a broadband amplifier that also feeds through a radio frequency filter that reduces the RF noise therefrom triggers the pulse generator that produces a train of pulses (20 to 100 nanoseconds wide). The pulse generator has another input, i.e. an input from a word generator that is comprised of coded data. A train of pulse coded data from the pulse generator is applied to a high voltage pulsed power supply which, in turn, switches the electrooptic Pockels Cell at the time the tail portion is being directly applied thereto through the beam splitter so that only the tail portion is pulse code modulated by the high voltage pulse power supply. The invention will be better understood by the description herein below with reference to the following drawings.

BRIEF DESCRIPTION OF THE DRAWINGS

FIG. 3 illustrates the gain switched spike and tail portion with typical pulse coded data as provided by the word generator on the tail portion.

DETAILED DESCRIPTION OF THE PREFERRED EMBODIMENT

Figure 1:
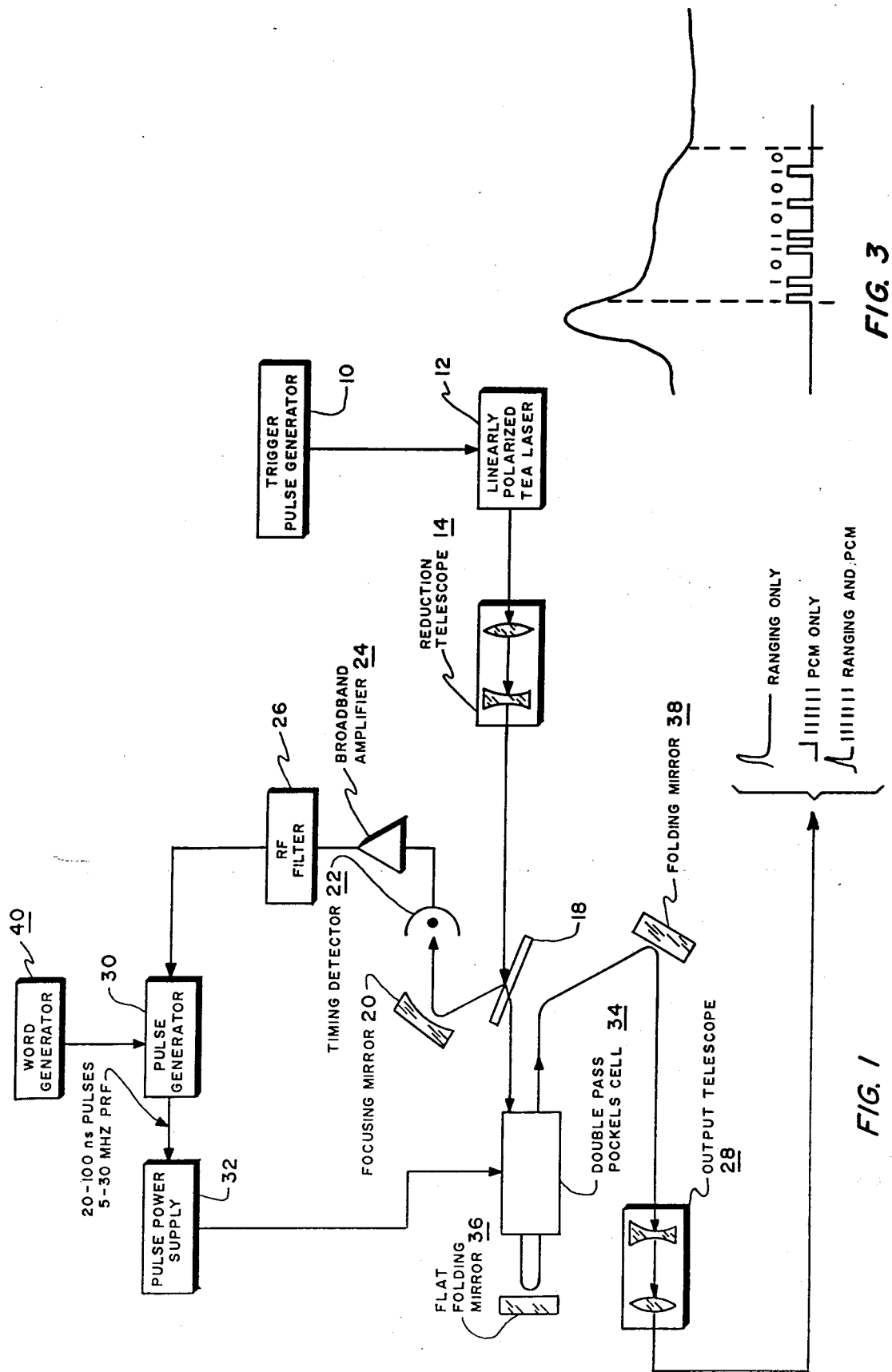
FIG. 1 is a schematic block diagram of the present laser beam pulse code modulation system.

Refer to FIG. 1 which shows the linearly polarized $CO_2$ TEA laser 12 that is initially activated by manual triggering of a trigger pulse generator 10, in which 10 may be a Rutherford Electronics Model B16 or equivalent. A laser beam gain switched spike having a tail section on its trailing edge is produced by the activated laser 12. The output laser beam is demagnified by a 3:1 ratio reduction telescope 14 to approximately 3 millimeter in diameter.

A beam splitter 18, preferably made of Germanium, in optical alignment with the linearly polarized $CO_2$ TEA laser 12 and telescope 14 is placed at its Brewster's Angle. As the laser beam gain switched spike and tail portion passes through the beam splitter 18 and into the electrooptic Pockels Cell modulator 34 a portion of the laser beam is scattered off the front face and is collected by focusing mirror 20. Focusing mirror 20 focuses the radiation onto the timing detector 22, which is preferably made of Mercury-Cadmium-Telluride. The timing detector has an output therefrom that is applied to broadband amplifier 24. Broadband amplifier 24 may be a Hewlett-Packard Model HP 461A or equivalent. To reduce the large amount of radio frequency noise generated by laser 12, a radio frequency (RF) filter 26 follows the broadband amplifier 24 to produce a trigger pulse that is applied to pulse generator 30. Pulse generator 30 may be a Hewlett-Packard Model HP 214A or equivalent. A word generator 40 produces coded words that are applied to pulse generator 30. Generator 30 produces a train of coded pulses of 20 to 100 nanosecond pulse widths at 5 to 30 megahertz repetition rate within a 2 microsecond gate. The train of pulses are used to drive the high voltage pulse power supply 32, which supplies 20 to 100 nanosecond pulses of about 1325 volts each. The Pockels Cell modulator is fabricated from Cadmium-Telluride with dimensions of 3 mm $\times$ 3 mm $\times$ 6 cm. The quarter wave voltage for transversely exciting the crystal is approximately 1325 volts. The 20 to 100 nanosecond pulse, 1325 volt pulse is applied to the electrooptic Pockels Cell 34 to induce an electrooptic retardation which causes the polarized light, which has passed through the Brewster's angle beam splitter 18, to rotate its polarization about the optical axis. It should be noted that a higher repetition rate than the 5 to 30 megahertz and shorter pulses are possible with avalanche transistor design of the power supply 32. It is important to have a high repetition rate for the Pockels Cell 34 such that many pulses can occur during a single laser pulse. Word generator 40 determines the sequence of the coded pulse words, represented as 1's and 0's, that will be encoded into the tail portion within the Pockels Cell 34. A word is unique by the sequence of 1's and 0's in the total length of the tail. The word generator 40 may even produce only one word. The electrooptic Pockels Cell may be a Series EOM3 General Purpose $CO_2$ Laser Modulator manufactured by II-VI Incorporated, which is constructed out of Cadmium-Telluride and typically has cell dimensions of $3 \times 3 \times 60$ millimeters. Gallium-Arsenide electrooptic crystals may also be substituted for the Cadmium-Telluride crystals. The electric field is applied transversely along the cube diogonal $<111>$ direction perpendicular to the propogation axis. The resulting polarization occurring after traversing the energized Pockels Cell 34 twice is linearly polarized perpendicular to the Germanium Brewsters angle beam splitter 18. When the laser beam gain switched spike and tail portion is propogated through the Pockels Cell and the Pockels Cell is energized by the high voltage power pulses from supply 32, the resulting polarization of the laser beam exiting the double pass Pockels Cell 34 causes the beam to reflect off beam splitter 18 and to propagate to some remote receiver by being reflected off folding mirror 38 and through output telescope 28.

Operation of the electronic modulating circuit, which is comprised of the timing detector 22, the broadband amplifier 24, the radio frequency filter 26, the pulse generator 30, the word generator 40, and the high voltage pulse power supply 32, is to provide a delayed train of high voltage pulses with coded pulse words included therein that are applied to the electrooptic Pockels Cell modulator means 34 simultaneously with the arrival of the tail portion of the laser beam pulses that are transmitted through the beam splitter 18. It should be noted that alternatively the electrooptic Pockels Cell 34 may also cut-off the tail portion to enhance the gain switched spike to improve ranging accuracy. As the laser beam gain switched spike and tail portion move through the Pockels Cell 34 the phase retardation is 90° per pass for the double-pass but the polarization angle is a total of 90°, i.e. 45° at a pass which has the x-y components to establish components in each direction. The double pass Pockels Cell 34 as illustrated in FIG. 1 requires that beam splitter 18 be a polarizer beam splitter since after the two passes of the laser beam through 34 the laser beam returns 90° out of phase from when it was transmitted therethrough and is thus reflected off beam splitter 18 and folding mirror 38 through an output telescope 28 to a receiving station. In the situation where the Pockels Cell 34 may be a single pass type, beam splitter 18 may be plain and may not be a polarizer. Further, detector 22 may be at the opposite side of laser 12 (if two output beams are available from the laser) and no beam splitter at all in the optical path. When the Pockels Cell is a single pass, a polarizer is used at the output before the beam goes into the output optical means. In this case the flat folding mirror 36 and the folding mirror 38 are eliminated and replaced by the polarizer and an output telescope.

FIG. 3 shows a typical coded word as would be overlayed on the tail portion as applied by the word generator 40 through the pulse generator and power supply to the modulator 34.

Figure 2:
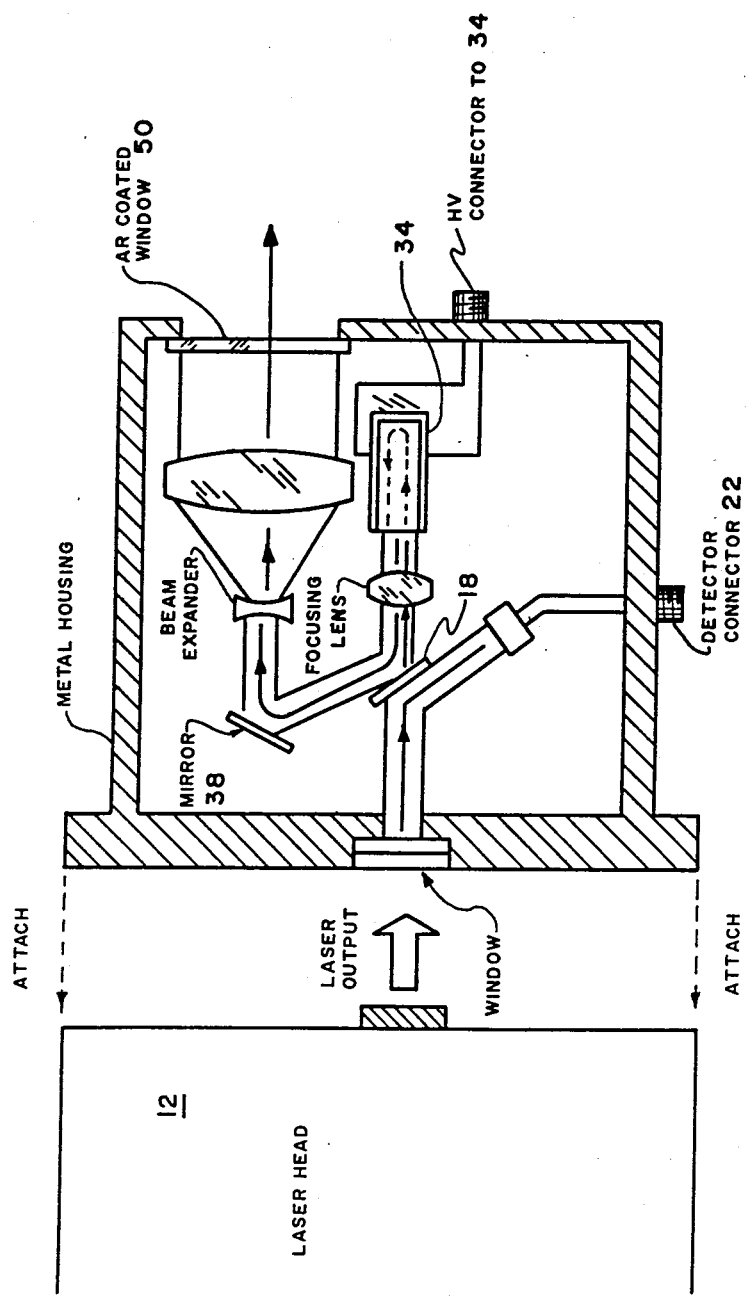
FIG. 2 shows a side view of a module comprised of the laser head and optical components of the present invention.

FIG. 2 illustrates the same components, and like numbered of the systems as shown by FIG. 1, but in the module attachment form. The folding mirror 38 is attached to the same housing as modulator 34 to minimize diffraction loss therebetween. The mirror and output optical means are further comprised of an antireflection coated window 50.

We claim:

1. A system for pulse code modulating the tail portions of a train of pulsed laser beams to provide coded messages for information transfer, said system comprising:

linearly polarized $CO_2$ TEA laser activated by a trigger pulse generator to produce a train of output laser beam gain switched spikes with tail portions therefrom;

telescoping optics for demagnifying the output laser beam;

a beam splitter positioned at the output of said telescoping optics in optical alignment with said linearly polarized $CO_2$ TEA laser and said telescoping optics, said beam splitter placed at the Brewster's angle to simultaneously reflect a portion of each output laser beam gain switched spike and tail portion while transmitting the remainder therethrough;

an electrooptics Pockels Cell modulator means in optical alignment with said beam splitter to directly receive the laser beam gain switched spike and tail portions transmitted through said beam splitter;

an electronic modulating circuit that receives the reflected portion of the output laser beam gain switched spike and tail portion onto a timing detector and after a time delay by said timing detector produces a train of coded pulse words of said tail portion that is applied to a high voltage pulse power supply wherein a train of high voltage pulses produced at the repetition rate of said train of coded pulse words are applied to said electrooptics Pockels Cell modulator means simultaneously with the arrival of the tail portion that is transmitted through the beam splitter wherein said train of high voltage pulses pulse code modulate said tail portion while selectively leaving said gain switched spike unmodulated said spike being used for ranging; and mirror and output optical means for transmitting the pulse code modulated data to a receiving station.

2. A system as set forth in claim 1 wherein said electronic modulating circuit that produces said train of coded pulse words is more specifically comprised of said timing detector placed in line with said output beam reflected off a focusing mirror in which the output from said timing detector is amplified by a broadband amplifier and has the radio frequency noise of the amplified signal reduced by passing through a radio frequency filter prior to application to a pulse generator that produces a train of pulses therefrom in which a word generator provides an additional input of coded word data to said pulse generator to override the tail portion of each of said output laser beam gain switched spikes to form said train of coded pulse words of said tail portion at a high repetition rate that is applied to said high voltage pulse power supply to produce said train of high voltage pulses.

3. A system as set forth in claim 2 wherein said electrooptics Pockels Cell modulator means is a general purpose modulator made of Cadmium-Telluride and has an active length of 60 millimeters.

4. A system as set forth in claim 3 wherein telescoping optics is a 3:1 ratio telescope that demagnifies the output laser beam to about 3 millimeters in diameter.

5. A system as set forth in claim 4 wherein said beam splitter is made of Germanium placed at Brewster's angle.

6. A system as set forth in claim 5 wherein said train of high voltage pulses produced by said high voltage pulse power supply are 20 to 100 nanosecond pulses of about 1300 volts with very short rise and fall time.

7. A system as set forth in claim 6 wherein said train of coded pulse words at the output of said pulse generator are from 20 to 100 nanosecond pulses at from 5 to 30 megahertz repetition rate within a 2 microsecond gate.

8. A system as set forth in claim 7 wherein said word generator has 10 to 100 pulses available for producers coded words of 1's and 0's that are encoded onto the tail portion.

* * * * *